Nov. 18, 1941.   W. T. HEDLUND   2,263,270
REFRIGERATION
Filed March 9, 1938   2 Sheets-Sheet 1

INVENTOR.
William T. Hedlund
BY D. E. Heath
his ATTORNEY.

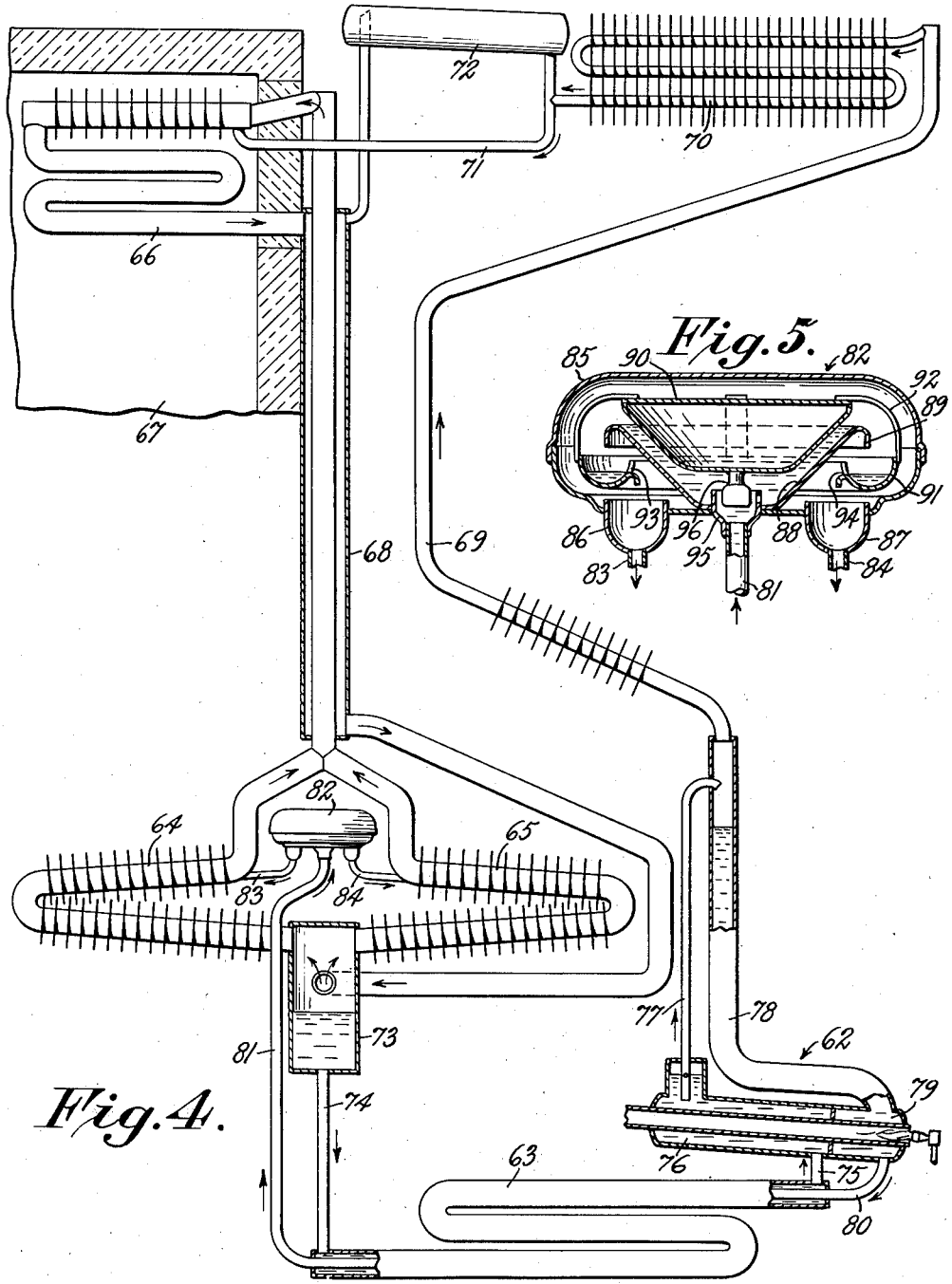

Patented Nov. 18, 1941

2,263,270

UNITED STATES PATENT OFFICE 2,263,270

REFRIGERATION

William T. Hedlund, New Rochelle, N. Y., assignor to Servel, Inc., New York, N. Y., a corporation of Delaware Application March 9, 1938, Serial No. 194,731

19 Claims. (Cl. 62—179)

My invention relates to liquid distribution, for instance, in refrigeration apparatus, and it is an object of the invention to provide improved liquid distribution.

Figure 1:
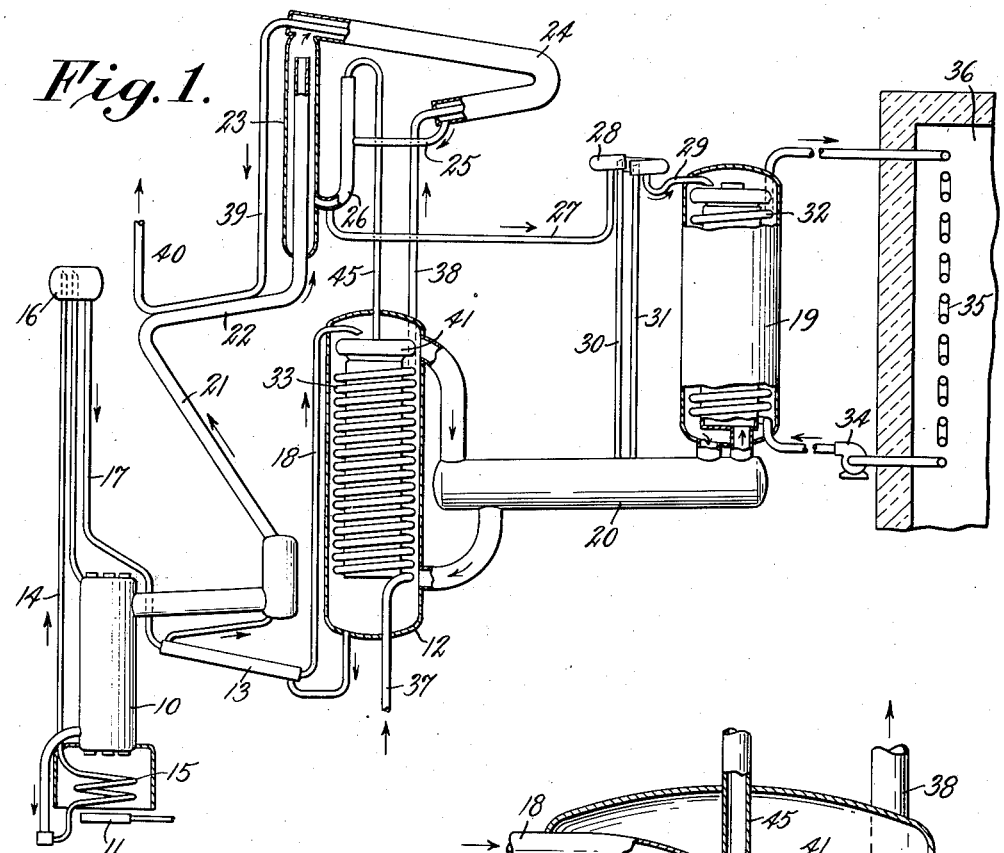
Figure 2:
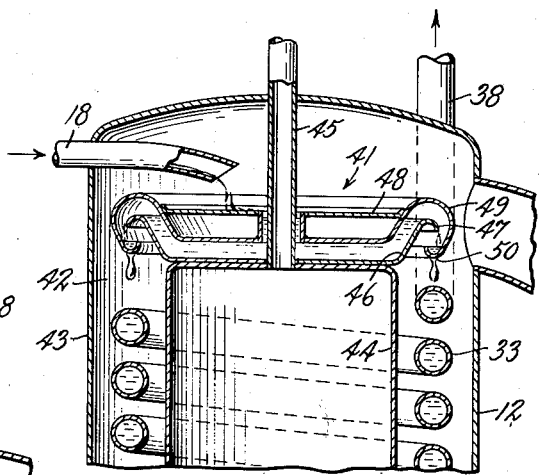
Figure 3:
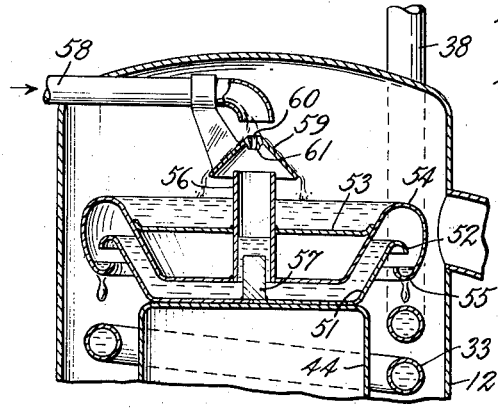

The drawings show absorption refrigeration systems embodying the invention. Fig. 1 shows a system more or less diagrammatically with parts in vertical section. Fig. 2 is an enlarged view showing details of the invention embodied in the system of Fig. 1. Fig. 3 is a view like Fig. 2 illustrating a modification. Fig. 4 shows another refrigeration system more or less diagrammatically. Fig. 5 is an enlarged sectional view showing details of the invention embodied in the system of Fig. 4.

The refrigeration system shown in Fig. 1 is generally like that described in application Serial No. 107,852 of A. R. Thomas, filed October 27, 1936, now Patent No. 2,207,838 granted July 16, 1940. Briefly, this system comprises an analyzer boiler or generator 10 heated by suitable means such as gas burner 11. An absorber 12 is interconnected with the generator 10 for circulation of absorption liquid therethrough and therebetween by members including a liquid heat exchanger 13. Circulation of liquid in this circuit is caused by vapor-lift action in a conduit 14 having a lower coiled portion 15 heated by the burner 11. Liquid is raised through conduit 14 from the lower part of generator 10 into a circulation vessel 16 from which the liquid overflows through a conduit 17, the liquid heat exchanger 13, and a conduit 18 into the upper part of the absorber 12.

The absorber 12 is interconnected with an evaporator 19 for circulation of gas therethrough and therebetween by members including a gas heat exchanger 20. Vaporous refrigerant fluid expelled from solution in the generator 10 flows through a conduit 21, a first rectifier 22, and a second rectifier 23 to a condenser 24. The refrigerant fluid is liquefied by condensation in the condenser 24. The liquid flows from condenser 24 through a conduit 25, a liquid trap 26 forming part of rectifier 23, a conduit 27, a liquid precooler 28, and a conduit 29 into the upper part of evaporator 19. The precooler 28 is connected with the gas heat exchanger by conduits 30 and 31 for circulation of gas from the heat exchanger through the precooler.

The liquid flows downward in evaporator 19 over a coil 32 and evaporates and diffuses into inert gas which circulates through and between the evaporator and absorber. In the absorber 12, absorption liquid which enters the upper part of the absorber through conduit 18 flows downward over a coil 33 and absorbs refrigerant vapor out of the inert gas. Circulation of the gas is caused by the greater specific weight of gas containing more of a heavier refrigerant vapor in the path of flow from the evaporator to the absorber as compared to the specific weight of weak gas flowing from the absorber toward the evaporator.

Fluid circulated, as by a pump 34, from a coil 35 to the evaporator coil 32 transfers heat from a refrigerator compartment 36, where coil 35 is located, to the evaporator 19. The absorber 12, condenser 24, and rectifier 22 are cooled by water which flows through a conduit 37, absorber coil 33, a conduit 38, the condenser 24, a conduit 39, rectifier 22, and a conduit 40.

Absorption liquid which enters the upper part of absorber 12 through conduit 18 should be distributed evenly as it is deposited on the upper turn of coil 33. This is in order that the upper part of coil 33 may be more effective in providing gas and liquid contact surface. I provide a novel device 41 which receives liquid from the upper end of conduit 18 and distributes the liquid over the upper end of absorber coil 33.

The device 41 is shown in detail in Fig. 2. The absorber coil 33 is located in an annular space 42 between an outer shell 43 and an inner shell 44. There is an opening, not shown, which affords communication between the lower part of the inner shell 44 and the lower part of the absorber. The upper end of shell 44 is connected by a conduit 45 to the upper part of the liquid trap 26 (see Fig. 1). Conduit 45 is known as a vent conduit and the inner shell 44 provides what is known as an accumulation vessel for inert gas, also referred to as a pressure vessel. On the upper end of shell 44 is secured a circular tray 46 with an outward depending rim 47. In the tray 46 is an annular float 48 loosely surrounding conduit 45 having a flange or rim 49 which curves outward around the rim 47 of tray 46 and downward beneath the rim 47. The lower edge of flange 49 beneath rim 47 is turned upward to form an annular trough 50. The annular trough 50 is located beneath the rim 47 of tray 46 and is carried by the float 48 which is within the tray 46.

To assemble tray 46 and float 48, the tray 46 may be made in sections which are joined after the rim 47 is inserted within the encircling flange 49. The bottom edge of the trough 50 is located directly above the upper turn of the absorber coil 33. The annular float 48 is located around vent conduit 45 and this conduit extends through the bottom of tray 46 to the upper end of shell 44. The upper end of conduit 18 is open and located just above float 48.

During operation of the refrigeration system, weak absorption liquid issues from conduit 18 and descends through the opening in the center of annular float 48 into tray 46. The float 48 floats upon the liquid in tray 46. Weak absorption liquid overflows the rim 47 of tray 46 and descends into trough 50 suspended from the float 48. The liquid overflows the inner edge of annular trough 50 and drips from the underside of trough 50 onto the upper turn of absorber coil 33. The surface level of liquid in tray 46 is always level due to force of gravity. For this reason float 48 is always level. If the absorber 12 is tilted, as when the entire unit is placed a little off the vertical, or if shifting should take place after installation so that tray 46 is not level, yet the surface level of liquid in tray 46 will be level and the float 48 will remain level so that overflow of liquid from trough 50 will remain substantially evenly distributed around its periphery. When tray 46 is tilted, overflow of liquid from this tray will be localized toward the low side, but the overflow liquid enters the level trough 50 and is distributed around this trough for even distribution of overflow therefrom onto the upper turn of coil 33.

Fig. 3 is a side view like Fig. 2 illustrating a modification in which overflow takes place from a dished float. A circular tray 51 having a downturned rim 52 is located on the upper end of the inner absorber shell 44. In the tray 51 is an annular float 53 having a rim or flange 54 which extends outward and downward around rim 52 of tray 51 and forms an annular trough 55 beneath rim 52 and directly above the upper turn of absorber coil 33. A cylinder 56 forms an upstanding ledge around the center opening of the annular float 53. The ledge 56 extends upward above the upper edge of flange 54. A pin 57 may be provided in the center of tray 51. Pin 57 extends very loosely upward into the center opening of float 53 to roughly center the float in tray 51.

In this modification, the vent conduit 45 shown in Figs. 1 and 2 is not connected to the upper end of shell 44 but may be connected to the side of vessel 44 or some other part of the absorber-evaporator gas circuit.

Weak absorption liquid enters the absorber 12 through a conduit 58 which corresponds to conduit 18 in Figs. 1 and 2. The open end of conduit 58 is turned downward directly above the center opening in float 53. A conical baffle plate 59 is located with its apex directly beneath the open end of conduit 58 and forms a shield over the center opening of float 53. In the apex of shields 59 is a small opening 60 having a lower ledge 61.

During operation, weak absorption liquid emerges from conduit 58 and descends upon the conical baffle 59. Most of the liquid is directed by baffle 59 onto the float 53 where it accumulates in the dished portion formed by the ledge 56 and rim 54. Some liquid passes through opening 60 and drops from ledge 61 through the center opening of float 53 into tray 51. The float 53 is buoyed upon liquid in tray 51. Liquid in the float 53 overflows rim 54 and drips from the bottom of trough 55 onto the upper turn of absorber coil 33. Any liquid which overflows rim 52 of tray 51 will be received in trough 55 and overflow the inner edge of trough 55 and drip upon the coil 33. Since the surface of liquid in tray 51 remains level, float 53 remains level even though the absorber and tray 51 is tilted, whereby overflow from float 53 and dripping of liquid from the bottom of trough 55 is substantially evenly distributed around the circumference.

This liquid distributor may also be used to distribute liquid in the evaporator 19 from conduit 29 from the upper turn of coil 32. If overflow from this compensated device is desired at certain points, notches or similar weirs could be made in the inner edge of troughs 50 or 55 at the desired points.

The refrigeration system shown in Fig. 4 utilizes an embodiment of the invention for distributing liquid to a plurality of absorbers. A generator 62 is connected by way of a liquid heat exchanger 63 with two absorbers 64 and 65 for circulation of absorption liquid therethrough and therebetween, the liquid flowing in parallel through the absorbers. An evaporator 66, located for instance in a refrigerator storage compartment 67, is connected by way of a gas heat exchanger 68 with the absorbers 64 and 65 for circulation of gas therethrough and therebetween, the gas flowing in parallel through the absorbers.

The generator 62 is connected by a conduit 69 to a condenser 70 for flow of refrigerant vapor from the generator to the condenser. Liquefied refrigerant flows from the condenser 70 through a conduit 71 to the upper part of the evaporator 66. A pressure vessel 72 is connected between the liquid outlet end of the condenser 70 and the gas circuit.

The absorbers 64 and 65 are shown as finned pipe coils joined together at their upper ends and having their lower ends connected to a common absorber vessel or sump 73. Rich liquor in the absorber vessel 73 flows through conduit 74, liquid heat exchanger 63 and conduit 75 to chamber 76 of the generator 62. Liquid is raised by vapor lift action from chamber 76 through a vapor lift conduit or thermosyphon 77 into the upper part of a generator standpipe 78. The lower end of standpipe 78 is connected to generator chamber 79. Weakened absorption liquid flows from chamber 79 through a conduit 80, liquid heat exchanger 63, and a conduit 81 to a distributor 82. Liquid flows from the distributor 82 through conduits 83 and 84 to the upper ends of absorbers 64 and 65 respectively.

The distributor 82 is shown in detail in Fig. 5. The distributor comprises an outer casing 85 provided with two cups or sumps 86 and 87. The liquid lines 83 and 84 are connected to the bottom of cups 86 and 87 respectively. Within the casing 85 is a tray or pan 88 having a downturned rim 89. In the tray 88 is a float 90. Beneath the rim 89 is an annular trough 91. The trough 91 is suspended from the float 90 by arms 92. The trough 91 is provided with two diametrically opposite weirs 93 and 94 which are located directly above the cups 86 and 87 respectively. Conduit 81 is connected by a sleeve 95 to the bottom of tray 88. The upper end of sleeve 95 is somewhat flattened. A flat pin 96 on the bottom of float 90 projects loosely into the upper end of sleeve 95. The pin 96 does not obstruct flow of liquid through sleeve 95 but prevents turning of the float and keeps the weirs 93 and 94 located over the cups 86 and 87.

In operation, weak liquor rises in conduit 81, sleeve 95, and tray 88 and overflows rim 89 into the trough 91. Liquid is raised by the vapor lift 77 to such a level in the generator standpipe 78 that said overflow of liquid into the trough occurs. Liquid in the trough 91 overflows the weirs 93 and 94 into the cups 86 and 87 respectively, and flows through conduits 83 and 84 to the absorbers 64 and 65 respectively.

The float 90 is buoyed on the liquid in tray 88. The surface level of liquid in tray 88 remains horizontal even through the refrigeration apparatus should be installed on a slant or become uneven due to settling after installation. Therefore the float 90 and the trough 91 suspended therefrom remains horizontal so that liquid evenly overflows the weirs 93 and 94 and even distribution of liquid to the absorbers 64 and 65 is not interfered with by uneven installation of the refrigeration apparatus.

Various changes and modifications may be made within the scope of the invention which is not limited except as indicated in the following claims.

What is claimed is:

1. A method of liquid distribution which includes holding a body of liquid at rest, separately maintaining a second body of liquid, floating said second body of liquid on said first body, and flowing liquid from said second body at a plurality of points to effect distribution of the liquid.

2. A method of liquid distribution for use in producing refrigeration which includes conducting liquid to a distributor, flowing said liquid from said distributor into the presence of inert gas, and maintaining said distributor level by flotation on a body of liquid.

3. In a refrigeration system making use of evaporation of liquid in the presence of inert gas and absorption of vapor out of the gas by liquid absorbent, a device for distributing liquid into the presence of the gas, and means to hold a body of liquid with such liquid body having a free surface on which said device floats so it will assume and maintain a certain position relative to the plane of said surface.

4. Gas and liquid contact apparatus for a refrigeration system comprising a casing, an inlet connection for liquid to the upper part of said casing, an inlet connection for gas, a cylindrical pipe coil providing a liquid spreading surface within said casing, a tray in the upper part of said casing having an outward depending rim and arranged to receive liquid from said first inlet connection, an annular float in said tray, and an annular trough suspended from said float between said rim and the upper end of said coil for distribution of overflow liquid by dripping from the underside of the trough onto the upper turn of said coil.

5. In a refrigeration system, a liquid distributor, means for maintaining a body of liquid with the liquid body having a free surface, said distributor being freely floated thereon so it will assume and maintain a certain position relative to the plane of said surface, and said distributor being formed and arranged so that liquid can flow therefrom at a plurality of points to effect distribution of liquid.

6. A method of liquid distribution which includes holding a first body of liquid at rest, separately maintaining a second body of liquid, floating said second body of liquid on said first body, and overflowing liquid from said second body to effect distribution of such liquid.

7. A method of liquid distribution which includes holding a first body of liquid at rest, separately maintaining a second body of liquid, floating said second body of liquid on said first body, supplying liquid to said second body from said first body, and distributing liquid from said second body at a plurality of points.

8. A method of liquid distribution which includes holding a first body of liquid at rest, separately maintaining a second body of liquid, floating said second body of liquid on said first body, overflowing liquid from said first body to said second body, and distributing liquid from said second body at a plurality of points.

9. A method of liquid distribution which includes holding a first body of liquid at rest, separately maintaining a second body of liquid absorbent, floating said second body of liquid absorbent on said first body, and distributing liquid absorbent from said second body into the presence of refrigerant vapor for absorption of such vapor.

10. A method of liquid distribution which includes holding a first body of liquid absorbent at rest, supplying liquid absorbent to said first body, separately maintaining a second body of liquid absorbent, floating said second body on said first body, overflowing liquid from said first body to said second body, and overflowing liquid from said second body to effect distribution of such liquid into the presence of refrigerant vapor for absorption of such vapor.

11. A method of liquid distribution which includes holding a first body of liquid at rest, separately maintaining a second body of liquid, floating said second body of liquid on said first body, and distributing liquid from said second body into the presence of inert gas for evaporation and diffusion into the gas.

12. A method of liquid distribution which includes holding a first body of liquid at rest, separately maintaining a second body of liquid, floating said second body of liquid on said first body, and distributing liquid from said second body into the presence of inert gas and vapor for the absorption of the vapor out of the gas.

13. In a refrigeration system, a liquid distributor, means for holding a body of liquid with such liquid body having a free surface, said distributor being capable of floating on the body of liquid in such a manner that it will assume and maintain a certain position relative to the plane of said surface during liquid distribution, and said distributor being formed and arranged to receive liquid from said liquid holding means.

14. In a refrigeration system, a liquid distributor, means for holding a body of liquid with such liquid body having a free surface, said distributor being capable of floating on the body of liquid in such a manner that it will assume and maintain a certain position relative to the plane of said surface during liquid distribution, and said distributor being formed and arranged to receive liquid overflowing from said liquid holding means.

15. In a refrigeration system, a liquid distributor, a circular tray for holding a body of liquid with such liquid body having a free surface, said distributor being disposed in said tray and capable of floating freely on the body of liquid therein, and said distributor having an annular trough arranged to receive liquid overflowing the rim of said tray.

16. In a refrigeration system, a liquid distributor, a circular tray for holding a body of liquid with such liquid body having a free surface, said distributor comprising a dished float capable of floating freely on the body of liquid in said tray and having a rim extending over the edge of said tray.

17. Gas and liquid contact apparatus for a refrigeration system comprising a casing, an inlet connection for introducing liquid into the top part of said casing, an inlet connection for introducing gas to said casing, a pipe coil having a plurality of turns to provide a liquid spreading surface within said casing, a tray disposed in the top part of said casing, said tray having an outward depending rim and arranged to receive liquid from said liquid inlet connection, an annular dished float in said tray arranged to receive most of the liquid from said liquid inlet connection, said float having a peripheral edge portion, an annular trough suspended by said peripheral edge portion so that liquid will overflow from said float and pass over such peripheral edge portion to the bottom of said trough, said trough being disposed between said rim and the top of said coil for distribution of overflow liquid by dripping from the bottom of said trough onto the top turn of said coil.

18. A method of liquid distribution which includes holding a first body of liquid at rest, separately maintaining a second body of liquid, floating said second body of liquid on said first body in such a manner that during liquid distribution said second body will always assume a certain position relative to the plane of the liquid surface of said first body, and distributing liquid from said second body.

19. In a refrigeration system, a liquid distributor, means for holding a body of liquid with such liquid body having a free surface, and said distributor and liquid holding means being so constructed and arranged that during liquid distribution said distributor will float on the body of liquid in said liquid holding means and always assume a certain position relative to the plane of said surface.

WILLIAM T. HEDLUND.